(12) United States Patent
Goldmann et al.

(10) Patent No.: US 7,681,813 B2
(45) Date of Patent: *Mar. 23, 2010

(54) SYSTEM AND METHOD FOR TREATING SHREDDER RESIDUES

(75) Inventors: Daniel Goldmann, Goslar (DE); Bram den Dunnen, Wolfsburg (DE); Michael Knust, Isenbuettel (DE)

(73) Assignee: Volkswagen AG, Wolfsburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/142,488

(22) Filed: Jun. 19, 2008

(65) Prior Publication Data

US 2008/0251616 A1    Oct. 16, 2008

Related U.S. Application Data

(63) Continuation of application No. 10/415,450, filed as application No. PCT/EP01/10460 on Sep. 11, 2001.

(30) Foreign Application Priority Data

Oct. 27, 2000    (DE) ................................ 100 53 487

(51) Int. Cl.
  *B02C 23/14*    (2006.01)
(52) U.S. Cl. ................. 241/24.14; 209/3; 241/79.1
(58) Field of Classification Search ... 241/24.12–24.15, 241/24.17–24.19, 79, 79.1; 209/3
  See application file for complete search history.

(56) References Cited

U.S. PATENT DOCUMENTS

| | | | |
|---|---|---|---|
| 3,848,813 A | * | 11/1974 | Stanczyk et al. ............ 241/19 |
| 3,885,744 A | * | 5/1975 | Drage ....................... 241/23 |
| 4,033,458 A | | 7/1977 | Chazen et al. |
| 4,036,441 A | | 7/1977 | Basten et al. |
| 4,299,376 A | | 11/1981 | Weiss |
| 4,341,353 A | | 7/1982 | Hamilton et al. |
| 4,617,112 A | | 10/1986 | Stout et al. |
| 4,815,668 A | | 3/1989 | Frei |

(Continued)

FOREIGN PATENT DOCUMENTS

DE    42 05 309    8/1993

(Continued)

OTHER PUBLICATIONS

Karl-Ulrich Rudolph et al., "Stand der Behandlung und Verwertung von Shredderrueckstaenden aus Altautos," Muell und Abfall, Dec. 1997, pp. 745 to 755.

(Continued)

*Primary Examiner*—Mark Rosenbaum
(74) *Attorney, Agent, or Firm*—Kenyon & Kenyon LLP

(57) ABSTRACT

In a method for sorting shredder residues of metal-containing wastes, e.g., vehicle bodies, the shredder residues are separated into a shredder light fraction and a non-ferromagnetic fraction (shredder heavy fraction). A system is arranged for sorting shredder residues of metal-containing wastes, e.g., vehicle bodies. At least parts of the primary material streams produced during the sorting of the shredder light fraction and the shredder heavy fraction in preliminary processes are fed to a common, main process for final processing, at least a ferromagnetic fraction, a fraction containing non-ferromagnetic metals, a granulate fraction, a fiber fraction, and a sand fraction being produced as end products.

18 Claims, 2 Drawing Sheets

U.S. PATENT DOCUMENTS

| | | |
|---|---|---|
| 5,080,291 A | 1/1992 | Bloom |
| 5,133,505 A | 7/1992 | Bourcier et al. |
| 5,443,157 A | 8/1995 | Baker et al. |
| 5,535,891 A | 7/1996 | Kuniyone et al. |
| 6,070,733 A | 6/2000 | Osing |
| 6,086,000 A | 7/2000 | Murata |
| 6,203,595 B1 | 3/2001 | Edlinger |
| 6,422,493 B1 | 7/2002 | Simon et al. |
| 6,437,353 B1 | 8/2002 | Benner |
| 6,578,783 B2 | 6/2003 | Simon et al. |
| 6,666,335 B1 | 12/2003 | Bradley et al. |
| 2004/0251173 A1 | 12/2004 | Goldmann et al. |
| 2004/0251335 A1 | 12/2004 | Goldmann et al. |

FOREIGN PATENT DOCUMENTS

| | | |
|---|---|---|
| DE | 44 37 852 | 5/1996 |
| DE | 195 32 505 | 12/1996 |
| DE | 197 03 577 | 6/1998 |
| DE | 197 24 860 | 12/1998 |
| DE | 197 31 874 | 2/1999 |
| DE | 197 42 214 | 4/1999 |
| DE | 197 55 629 | 6/1999 |
| DE | 199 11 010 | 10/2000 |
| EP | 0 863 114 | 9/1998 |
| EP | 0 884 107 | 12/1998 |
| EP | 0 922 749 | 6/1999 |
| EP | 0 979 677 | 2/2000 |
| GB | 1 466 491 | 4/1975 |
| WO | WO 98/01276 | 1/1998 |
| WO | WO 00/53324 | 9/2000 |

OTHER PUBLICATIONS

Aufbereitungs-Technik, vol. 8, chapter 392, p. 8, 1975.
International Search Report, International Application No. PCT/EP01/10460, dated Dec. 18, 2001. (translated).
Search Report, European Application No. 100 53 487.2; dated May 31, 2001.
International Search Report, International Application No. PCT/EP01/10458, dated Feb. 15, 2002.
Search Report, European Application No. 06 01 7837, dated Mar. 10, 2008 (translated).
International Search Report, International Application No. PCT/EP01/10459, dated Jan. 14, 2002.
Search Report, European Application No. 06 01 7836, dated Mar. 10, 2008 (translated).

* cited by examiner

SYSTEM AND METHOD FOR TREATING SHREDDER RESIDUES

CROSS-REFERENCE TO RELATED APPLICATIONS

The present application is a continuation of U.S. patent application Ser. No. 10/415,450, filed Nov. 17, 2003 which is the national stage of PCT International Patent Application No. PCT/EP01/10460, having an international filing date of Sep. 11, 2001, each of which is expressly incorporated herein in its entirety by reference thereto.

FIELD OF THE INVENTION

The present invention relates to a method for sorting shredder residues of metal-containing waste for the purpose of producing fractions that may be used as materials and raw materials, and for energy, as well as to a system that may sort the shredder residues.

BACKGROUND INFORMATION

The shredding of scrapped vehicles for breaking down materials has been known for a long time. In carrying out the shredding method, method controls have been established in which the material mixture produced is divided up into different fractions. Thus, a so-called shredder light fraction (SLF) is initially separated from the material mixture produced, using a suitable suction device. The remaining fraction is subsequently separated into a ferromagnetic fraction (shredder scrap (SS)) and a non-ferromagnetic fraction (shredder heavy fraction (SHF)), using a permanent-magnet separator. The portion of the metallurgically fully usable shredder scrap-metal fraction is often approximately 50 to 75 wt. %. Existing designs generally provide for the shredder light fraction being disposed of as waste or burned in waste incinerators. It is characterized by both a large fraction of organics and a large fraction of fine-grained material. The heavy fraction, which is not able to fly and is not ferromagnetic, i.e., the shredder heavy fraction, is distinguished by a high percentage of nonferrous (NF) metals. Special sorting systems have been developed for recovering the different NF metals, where, however, the remaining residue of organic and inorganic, non-metallic components is generally disposed of as waste. In the following, shredder residues should be understood as all material streams from the shredding process, which may not be directly removed at the shredder as products that are metallurgically directly utilizable (shredder scrap).

Described in German Published Patent Application No. 44 37 852 is a method, in which the shredder light fraction is sorted to remove "unwanted components", in particular copper and glass. In this context, the shredder residues are homogenized and mixed in a compulsory mixer with a fine-grained to superfine-grained material containing a magnetizable component, and the resulting mixture is conveyed through a magnetic separator. In this context, the metallic components of the shredder light fraction, which impede metallurgical use, can be separated out in this manner.

European Published Patent Application No. 0 863 114 describes the production of a permanently plastic, backfilling material for mines, by adding an adhesive component, a filler, and a salt solution to the shredder light fraction. This is intended to provide a pressure-resistant, permanently plastic body.

It is described in German Published Patent Application No. 197 42 214 that the shredder light fraction is shredded further and subjected to a thermal treatment. During or after shredding, metallic components should be sorted out and the remaining mixture of materials should be melted in a smelting reactor and converted to a "harmless" solid by cooling it.

In addition, European Published Patent Application No. 0 922 749 describes a method for processing the shredder light fraction, where the shredder light fraction is a calcined in a fluidized-bed gasifier amid the introduction of calcium carbonate.

In a further, thermal process, German Published Patent Application No. 197 31 874 describes the shredder light fraction being compressed again in a further step, and then shredded, homogenized, and reduced in water content, in order to be thermally utilized in a subsequent step.

European Published Patent Application No. 0 884 107 describes for the shredder light fraction being converted into a metal-free fraction having a shredding size of $\leq 20$ mm, by shredding, classifying, and sorting it. The sorting of the shredder light fraction should result in a thermally utilizable fraction.

In addition to the utilization methods, it is conventional that the shredder light fraction can be subjected to a pretreatment, in which residual ferromagnetic fractions of iron, stainless steel, and aluminum are separated. Similar methods have also been used for sorting the shredder heavy fraction. Furthermore, it is conventional that polyolefins can be separated from this fraction.

What the methods have in common is, that they are each only designed for processing the shredder light fraction or the shredder heavy fraction. Joint processing is not provided. In addition, the methods are not suitable under the aspect of maximizing the degree of use in the order of material use, raw-material use, and energetic use. Against the background of increasing legal requirements (EU End of Life Vehicles Directive, EU Directive on Incineration of Waste, and others), as well as increasing landfill costs and requirements for the material to be landfilled, a higher utilization rate may be desirable. Thus, the German regulation on end of life vehicles of Apr. 1, 1998 provides for over 95% of a scrapped car by volume having to be utilized as of the year 2015. In addition, increased requirements from the EU Scrapped Car Guideline passed in September, 2000 specify that the fraction of material streams utilizable as materials and raw materials for mechanical and feedstock recycling should be increased to at least 85%. Thus, utilization excludes the use as energy only, e.g., in waste incinerators.

Therefore, it is an object of the present invention to provide a method and a system by which the shredder residues may be jointly processed, and separated in a mechanical sorting process into end products usable for materials, raw materials, and energy recovery. In particular, the joint processing may allow the portion of the unusable fraction to be reduced to less than 5% of the total weight of the scrap vehicle, and allow the portion of end products usable as materials or raw materials to be increased.

SUMMARY

According to an example embodiment of the present invention, this object may be achieved by providing a method for sorting shredder residues of metal-containing wastes, e.g., vehicle bodies, as described herein, as well as by providing a system for sorting the shredder residues as described herein. The method may provide that at least parts of the primary material streams formed during the sorting of the shredder light fraction and the shredder heavy fraction in preliminary processes may be supplied to a joint, main process for the final processing. At least a ferromagnetic fraction, a fraction containing nonferrous metals, a granulate fraction, a fiber fraction, and a sand fraction may be produced as end products. The prepared end products may either be utilized directly or, if desired, subsequently processed in further refining steps to form utilizable, high-quality products.

Fe, stainless steel, and Al portions broken down in a preliminary treatment may be separated from the shredder light fraction. This shredder light fraction may be:
  broken down in a first shredding unit, and
  subsequently separated into at least a ferromagnetic fraction and a non-ferromagnetic fraction, using at least one magnetic separator;
  the non-ferromagnetic fraction is broken down in a second shredding unit,
  a fine-grained sand fraction is separated from this fraction, using at least one classifier, and
  the remaining fraction is separated into a fiber fraction and a course-grained, heavy-material fraction in at least one density-separation device.

The procedure, which includes the step-by-step breakdown of the shredder light fraction and the interposed method steps for separating out the particularly abrasive ferromagnetic components, may allow the operating costs to be kept low, e.g., in the case of the second shredding unit. In addition, the desired fiber and sand end products may already be separated out at this point of the overall process control for sorting the shredder residues. An example embodiment of the present invention may provide for a cellular-plastic fraction essentially made of polyurethane being additionally separated out in the preliminary process, using a suction device.

Each of the first and second shredding units may include a classifier positioned upstream from it for separating and supplying a sieved fraction. The diameter of the incoming fraction and the discharge of the shredding units may be adjusted to each other. This may allow the wear in the shredding units to be reduced.

In the preliminary process, the shredder heavy fraction may also be separated into at least an enriched fraction containing nonferrous metals, a heavy-material fraction, and a fine-grained sand fraction depleted in metals, using at least one metal separator and at least one classifier. In addition, it is possible for a high-density, residual fraction to be separated from the heavy-material fraction in at least one density-separation device. The shredder heavy fraction may be separated into different material streams from the standpoint of joint processing with the material streams previously produced in the preliminary process for processing the shredder light fraction.

In the main process, the material streams from the preliminary processes may be brought together in such a manner, that
  the sand fractions are combined into a common sand fraction, and
  the heavy-material fractions are combined into a common heavy-material fraction, broken down by a shredding unit, and separated by a density-separation device into the granulate fraction and an enriched fraction containing nonferrous metals.

Therefore, the desired end products of sand, granulate, and the fraction containing nonferrous metals may be produced in this partial process step. The fractions containing nonferrous metals may then be subjected to for separating out light-metal fractions, heavier nonferrous-metal fractions, and other metal fractions, e.g., in a common sorting step, using suitable process steps such as sand flotation and optical sorting. The nonmetallic, residual fractions produced during the separation may be resupplied to the main process and/or the preliminary processes at suitable points, as a function of amount and composition.

Further, example embodiments of the method are described below.

Example embodiments of the system according to the present invention are described below. Regarding the aspects of the system according to the present invention, reference is made, e.g., to the above-mentioned explanations relating to the method according to example embodiments of the present invention.

The present invention is explained below in detail in an exemplary embodiment with reference to the corresponding drawings.

DETAILED DESCRIPTION

Figure 1:
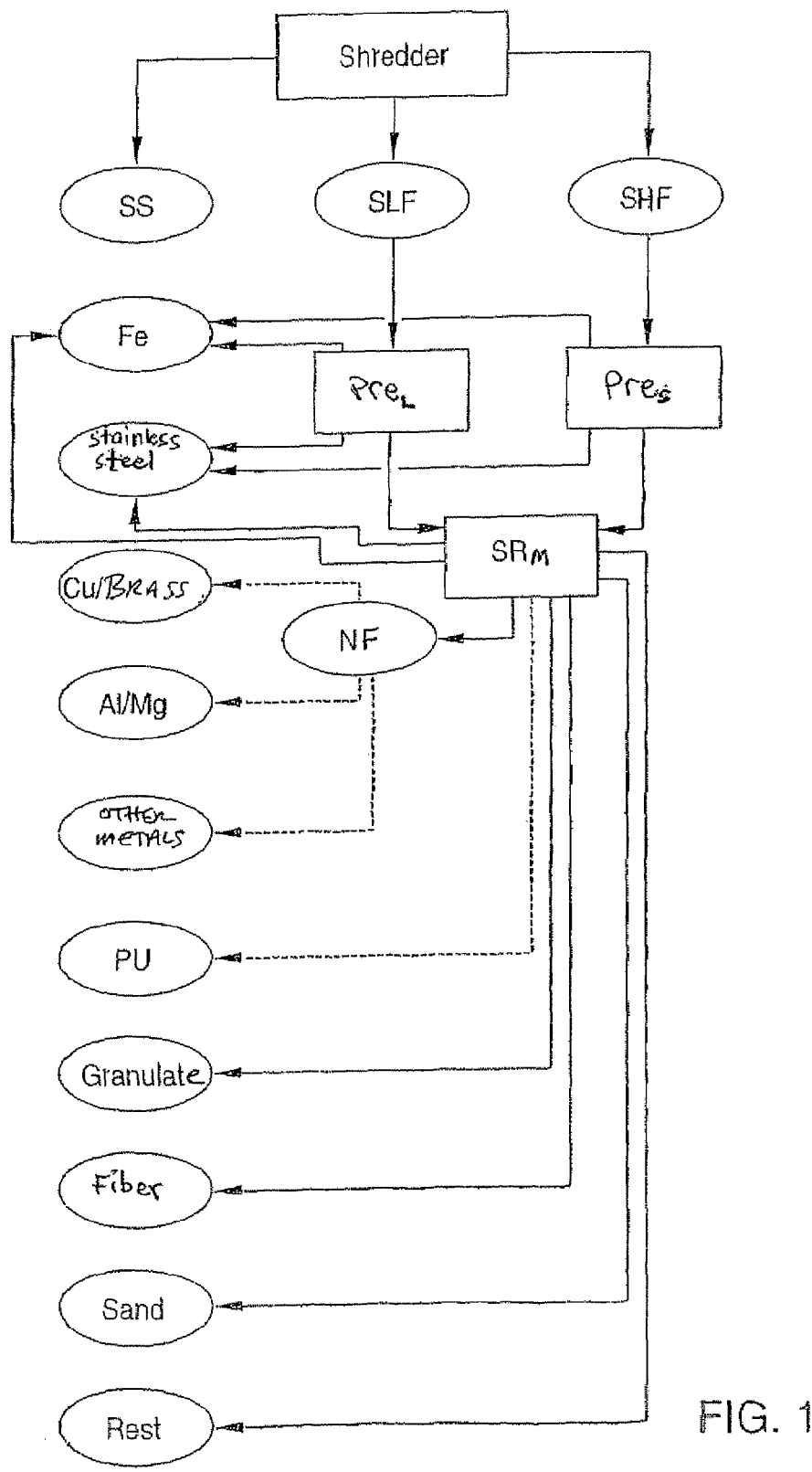
FIG. 1 is a flow diagram illustrating an overall view of the end products formed at specific times in the process of sorting the shredder residues.

FIG. 1 is a flow chart of the times at which end products are produced according to an example embodiment of the method of the present invention, during the sorting of the shredder residues. In an upstream shredding process, metal-containing wastes, e.g., those of vehicle bodies, are initially broken down by a shredder in a shredding process. A light fraction capable of flying is subsequently separated off by a suction device (shredder light fraction SLF). The heavy material stream, which remains after the suction and is not capable of flying, is separated on a permanent-magnet separator, into a ferromagnetic and a non-ferromagnetic fraction. The ferromagnetic fraction is designated as shredder scrap SS and represents the primary shredder product, which may be used directly in metallurgy. The heavy, non-ferromagnetic fraction not capable of flying is referred to as shredder heavy fraction SHF. In a further pretreatment step, ferromagnetic components still present may be separated from shredder light fraction SLF by a magnetic separator. The remaining material stream of shredder light fraction SLF and shredder heavy fraction SHF are jointly separated as shredder residues into the desired end products.

To this end, the process control provides a preliminary process $Pre_L$ for shredder light fraction SLF, a preliminary process $Pre_s$ for shredder heavy fraction SHF, and a joint, main process $SR_M$ for final processing of at least a part of the primary material streams produced in the preliminary processes $Pre_L$, $Pre_s$. According to the exemplary embodiment, fractions, which are predominantly made up of highly pure iron Fe, stainless steel, fiber, sand, granulate, cellular plastic PU, and a residue to remove, are formed as end products. In addition, a nonferrous-metal fraction NF may be separated out, which, in turn, appropriate process control allows to be divided up into fractions having heavier nonferrous metals Cu/brass, light metals Al/Mg, and other metals. Except for the residual fraction, the end products formed may be used metallurgically, as materials, as raw materials, or for energy recovery.

Figure 2:
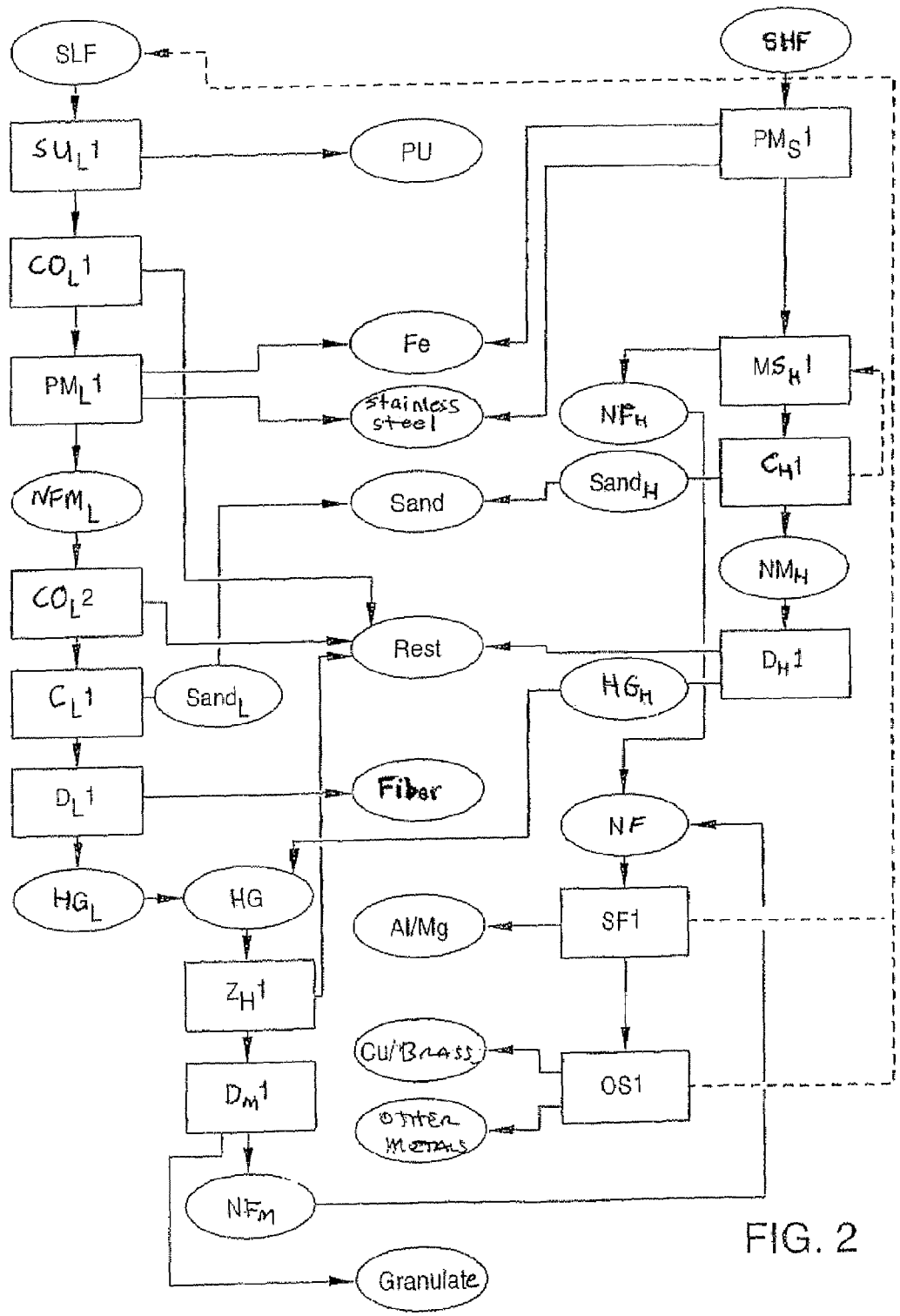
FIG. 2 is a schematic flow diagram for the process control in the preliminary sorting processes and the main sorting process.

FIG. 2 is a schematic flow diagram of the essential components of the system for sorting the shredder residues, as well as the respective intermediate or end products produced at these components during the process control. In order to retain an overall view, the end products produced during the process are arranged in the center. Preliminary process $Pre_L$ for sorting shredder light fraction SLF is schematically illustrated on the left part of the drawing, preliminary process $Pre_s$ for sorting shredder heavy fraction SHF is schematically illustrated on the right part of the drawing, and main process $SR_M$ is schematically illustrated in the center of the lower part of the drawing.

Shredder heavy fraction SHF is initially subjected to two-stage Fe and stainless steel separation by permanent magnet separator $PM_H1$. After Fe and stainless steel separation, the residual stream is classified, and fractions $NF_H$ containing heavier nonferrous metals are separated out. This may be accomplished, for example, by initial classification into different fractions, e.g., greater than and less than 20 mm, and by separately feeding each fraction to metal separator $MS_H1$. It is possible to have additional classification steps. In this context, it may be provided to achieve as clean a material separation as possible into fractions $NF_H$ containing heavier nonferrous metals, and remaining fractions $NM_H$ depleted in metals. Classifier $C_H1$ also provides for fractions $NM_H$, which are depleted in metals and have a particle diameter, e.g., <6 mm, being separated out as a sand fraction $Sand_H$.

Remaining coarse-grained fraction $NM_H$ depleted in metals is subsequently separated by a density-separation device $D_H1$ into a heavy-material fraction $HG_H$ and a high-density residual fraction Residue. This may prevent materials, which are still highly abrasive and have sharp edges, such as balls of high-grade steel, from being present in the shredding chamber during the further treatment of heavy-material fraction $HG_H$ in downstream shredding units. In addition, a metal separator may be installed at this position, in order to separate out the last solid, wear-promoting, metal contaminants. In summary, preliminary process $Pre_s$ accordingly may yield an iron fraction Fe, a stainless steel fraction, a fraction $NF_H$ containing heavier nonferrous metals, a sand fraction $Sand_H$, and a heavy-material fraction $HG_H$.

In preliminary process $Pre_L$, a cellular-plastic fraction PU, which is predominantly made up of the polyurethane that is highly capable of flying, is initially separated from shredder light fraction SLF in suction device $SU_L1$. The separated pieces of cellular plastic are pneumatically transported into a press container, where they are automatically compressed. This fraction may be directly utilized or optionally undergo a further refining step.

The remaining fraction is broken down in a first comminution unit $Co_L1$, and indeed in such a manner, that the discharge of unit $Co_L1$ contains particles having a diameter<50 mm. In order to keep the load on shredding unit $Co_L1$ as small as possible, a classifier may be positioned upstream from it, in order to separate out and supply a fraction having a diameter>50 mm. An iron fraction Fe and a stainless steel fraction are separated from the shredded fraction by a permanent magnet separator $PM_L$. Remaining non-ferromagnetic fraction $NFM_L$ is supplied to a second shredding unit $Co_L2$, in which the material is broken down further. In this context, the discharge of shredding unit $Co_L2$ is arranged to be <10 mm. In this case, the infeed of shredding unit $Co_L2$ may also be limited to a fraction having a diameter>10 mm, using a classifier.

In an additional classifier $C_L1$, a fine-grained sand fraction $Sand_L$ is separated from the now effectively broken-down, non-ferromagnetic fraction $NFM_L$. The particle size of sand fraction $Sand_L$ may be set to <4 mm. The remaining fraction is subjected to air sifting and density separation in a suitable device $D_L1$. In device $D_L1$, a light fraction made up of fiber is blown over a heavy-material trap. Due to being previously transported on a vibrating conveyor, the heavier material has already settled to the bottom, so that the underlying heavy fraction automatically falls down into a heavy-material discharge (heavy-material fraction $HG_L$). In summary, the end products and intermediate products of cellular-plastic pieces PU, iron Fe, stainless steel, $Sand_L$, and heavy material $HG_L$ may be provided in preliminary process $Pre_L$. The dust and sludges containing heavy metals and organic substances are fed to residual fraction Residue during the treatment in shredding units $Co_L1$ and $Co_L2$.

In main process $SR_M$, sand fractions $Sand_L$, $Sand_H$ are initially combined into a common sand fraction Sand. This fraction may optionally undergo a further refining step not represented here.

Heavy-material fractions $HG_L$ and $HG_H$ are also combined into a common heavy-material fraction HG. These are subsequently broken down again in a further shredding unit $Co_M1$. The discharge of shredding unit $Co_M1$ is arranged to be <8 mm. Shredding unit $Co_M1$ may take the form of an impeller breaker, in order that the material is optimally broken down at this position. After the shredding, density separation takes place on air-settling tables (density-separation device $D_M1$). The light fraction separated off is predominantly made up of plastic in granular form. In an additional refining process, the granulate may optionally be separated into further, utilizable end products. Remaining, heavy fraction $NF_M$ may be mostly made up of heavier nonferrous metals, mainly copper strands. Therefore, fraction $NF_M$ may already be removed from the process at this point, but it may also be combined with heavier nonferrous-metal fraction $NF_H$ into a common fraction NF, and be jointly sorted.

Fraction NF containing nonferrous metals may essentially be sorted by a sand flotation system SF1 and an optical sorter OS1. Sand flotation allows a light-metal fraction predominantly made up of aluminum and magnesium to be separated from a heavy-metal fraction in a dry mechanical manner. It should be noted that the sand used here as a separation medium has nothing to do with the fraction "Sand" separated from the shredder residues. The heavy metals sink into the sand bed, while the light metals float on the sand bed. An upper stream containing light metals and the lower screen enriched with the heavy metals are separated by a separating partition. The metal concentrates are separated again from the separating medium, Sand, in a process step belonging to sand flotation. Separated aluminum and magnesium fraction Al/Mg may optionally be separated to a further extent.

The separated heavy fraction (in particular zinc, copper, brass, lead, and possibly V4A steel) is separated into nonferrous metals copper/brass, as well as other metals, using optical sorter OS1. Depending on the amount and composition, any nonmetallic residues produced here may be fed in at a suitable position, such as, in this case, into preliminary process $Pre_L$. In summary, an Al/Mg fraction, a Cu/brass fraction, a fraction having other metals, and a granulate fraction are provided in the main process $SR_M$ having subsequent nonferrous-metal separation.

| REFERENCE SYMBOL LIST | |
|---|---|
| $SU_L1$ | suction device (separation of cellular-plastic fraction) |
| Al/Mg | light-metal fraction |
| Cu/brass | heavier nonferrous metal fraction |
| $D_M1, D_L1, D_H1$ | density-separation devices |
| Fe | iron fraction |
| Fiber | fiber fraction |
| Granulate | granulate fraction |
| $C_L1, C_H1$ | classifiers |
| $MS_H1$ | metal separator |
| NF, $NF_M$, $NF_L$, $NF_H$ | fractions containing nonferrous metals |

-continued

| REFERENCE SYMBOL LIST | |
|---|---|
| $NFM_L$ | non-ferromagnetic fraction |
| $NM_H$ | fraction depleted in metals |
| OS1 | optical sorter |
| $PM_L1, PM_H1$ | permanent-magnet separator |
| PU | cellular-plastic fraction |
| Residue | residual fraction |
| Sand, $Sand_L$, $Sand_H$ | sand fractions |
| SF1 | sand flotation system |
| HG, $HG_L$, $HG_H$ | heavy-material fractions |
| SLF | shredder light fraction |
| other metals | fraction having other metals |
| $SR_M$ | main process |
| SS | shredder scrap |
| SHF | shredder heavy fraction |
| $Pre_L$ | preliminary process for the shredder light fraction |
| $Pre_S$ | preliminary process for the shredder heavy fraction |
| $Co_L1, Co_L2, Co_M1$ | shredding units |

What is claimed is:

1. A method for treating shredder residues of metal-containing waste, comprising:
    separating the shredder residues into a shredder light fraction and a non-ferromagnetic fraction;
    separating each of the shredder light fraction and the non-ferromagnetic fraction into additional material streams in separate preliminary processes;
    feeding at least a part of one of the material streams of a first one of the preliminary processes and at least a part of the material stream of a second one of the preliminary processes to a joint main process for further processing; and
    producing from the main process an iron-containing fraction, a fraction containing nonferrous metals, a granulate fraction, a fiber fraction and a sand fraction.

2. The method according to claim 1, wherein the metal-containing waste includes waste of a vehicle body.

3. The method according to claim 1, wherein the metal-containing waste includes waste of one of a scrapped car and a crushed car.

4. The method according to claim 1, further comprising subjecting the shredder light fraction to an additional pre-treatment by a magnetic separator to separate out residual, ferromagnetic fractions.

5. A system for sorting shredder residues of metal-containing waste, the shredder residues including a light shredder fraction and a non-ferromagnetic fraction, comprising:
    an arrangement configured to supply to a joint, main process for final processing at least parts of primary material streams formed during sorting of the light shredder fraction and the non-ferromagnetic fraction in preliminary processes, to produce at least a ferromagnetic fraction, a fraction containing nonferrous metals, a granulate fraction, a lint fraction and a sand fraction as end products.

6. The system according to claim 5, wherein the shredder residues of metal-containing waste includes waste of vehicle bodies.

7. The system according to claim 5, further comprising a magnetic separator configured to separate residual ferromagnetic fractions from the light shredder fraction.

8. The system according to claim 5, further comprising an arrangement configured to process a pretreated, light shredder fraction in one of the preliminary processes, including in succession:
    a first shredding unit configured to break down the light shredder fraction;
    at least one magnetic separator configured to separate at least one ferromagnetic fraction from a non-ferromagnetic fraction;
    a second shredding unit configured to break down the non-ferromagnetic fraction;
    at least one classifier configured to separate out a fine-grained sand fraction; and
    at least one density-separation device configured to separate the lint fraction from a coarse-grained, heavy-material fraction.

9. The system according to claim 8, further comprising a suction device configured to separate out a cellular-plastic fraction adapted to process the pretreated, light shredder fraction in the one of the preliminary processes.

10. The system according to claim 8, wherein a classifier configured to separate and supply a fraction having a diameter of greater than 50 mm is arranged upstream from the first shredding unit, a discharge of the first shredding unit less than 50 mm.

11. The system according to claim 8, wherein a classifier configured to separate and supply a fraction having a diameter greater than 10 mm is arranged upstream from the first shredding unit, a discharge of the first shredding unit less than 10 mm.

12. The system according to claim 5, further comprising a metal separator and at least one classifier arranged in succession and configured to process the non-ferromagnetic fraction in one of the preliminary processes and to separate out at least an enriched fraction containing nonferrous metals, a heavy-material fraction and a fine-grained sand fraction lacking in metals.

13. The system according to claim 12, further comprising at least one density-separation device configured to separate a high-density, residual fraction from the heavy-material fraction.

14. The system according to claim 5, further comprising an arrangement configured to process in the main process material streams from the preliminary processes, including:
    an arrangement configured to combine sand fractions to form a common sand fraction;
    an arrangement configured to combine heavy-material fractions into a common heavy-material fraction;
    a shredding unit configured to break down the common heavy-material fraction; and
    a subsequent density-separation device configured to separate the granulate fraction and an enriched fraction containing nonferrous metals from the broken-down, common heavy-material fraction.

15. The system according to claim 14, further comprising an arrangement configured to combine metal fractions to form a common metal fraction.

16. The system according to claim 15, further comprising a sand-flotation system configured to separate the common metal fraction into a light-metal fraction and a heavy fraction.

17. The system according to claim 16, further comprising an optical sorter configured to separate the heavy fraction into a nonferrous metal fraction and another metal fraction.

18. The system according to claim 16, further comprising an arrangement configured to feed nonmetallic, residual fractions into at least one of the main process and the preliminary processes at suitable points.

* * * * *